(12) United States Patent
Marsetti

(10) Patent No.: US 7,699,160 B2
(45) Date of Patent: Apr. 20, 2010

(54) CONVEYOR COMPRISING A PLURALITY OF HINGED MODULES AND MEANS FOR AVOIDING AXIAL DISPLACEMENT OF THE MODULE HINGE PINS

(75) Inventor: Sergio Marsetti, Castelli Calepio (IT)

(73) Assignee: System Plast S.R.L., Telgate (Bergamo) (IT)

( * ) Notice: Subject to any disclaimer, the term of this patent is extended or adjusted under 35 U.S.C. 154(b) by 0 days.

(21) Appl. No.: 12/358,365

(22) Filed: Jan. 23, 2009

(65) Prior Publication Data
US 2009/0194393 A1    Aug. 6, 2009

(30) Foreign Application Priority Data
Feb. 1, 2008   (EP)   ................................. 08425061

(51) Int. Cl.
B65G 17/38   (2006.01)
(52) U.S. Cl. ...................................................... 198/853
(58) Field of Classification Search ................ 198/850, 198/851, 852, 853
See application file for complete search history.

(56) References Cited

U.S. PATENT DOCUMENTS

| | | | | | |
|---|---|---|---|---|---|
| 811,391 | A | * | 1/1906 | Gates | 474/224 |
| 5,305,872 | A | * | 4/1994 | Hutton | 198/853 |
| 5,634,550 | A | * | 6/1997 | Ensch et al. | 198/457.05 |
| 5,960,937 | A | * | 10/1999 | Stebnicki et al. | 198/851 |
| 6,213,292 | B1 | * | 4/2001 | Takahashi et al. | 198/853 |
| 6,662,938 | B2 | * | 12/2003 | Damkjaer | 198/852 |
| 6,814,223 | B1 | * | 11/2004 | Verdigets et al. | 198/844.1 |
| 7,530,454 | B2 | * | 5/2009 | Neely et al. | 198/853 |
| 7,556,142 | B2 | * | 7/2009 | Stebnicki et al. | 198/778 |

* cited by examiner

Primary Examiner—Joe Dillon, Jr.
(74) Attorney, Agent, or Firm—Cozen O'Connor

(57) ABSTRACT

A conveyor comprising a plurality of modules (1) arranged one after the other, each of said modules comprising two parallel front and rear walls (2,3), two parallel lateral walls (17) and a top and bottom surface (15) and projecting from said front and rear wall a plurality of module link ends (4), the module ends (4) of one module intermeshing with the module ends of the previous and successive modules, said module ends (4) including coaxially aligned openings (5) adapted to receive a transverse pin (6) for realisably joining said modules, said pin (6) comprising a first cylindrically shaped portion (7) extending in said openings (5) and a second portion (8), radially departing from one end of said first portion, said pin being rotatable, about a longitudinal axis (L) of said first portion (7) of the pin (6), between a first position (F) not restricting the axial movement of said pin (6) in said openings (5) and a second position (R) restricting said axial movement, a lateral portion (9) of each of said modules (1) comprising a seat (10) for housing and for restricting axial movement of said second portion (8) of the pin (6) when the pin is rotated in said second position (R), said seat (10) comprising a passage (13) for introducing in said seat at least a part of said second portion (8) of the pin (6), wherein said seat (10) and said pin (6) comprise means (11A, 11B) for releasably preventing the displacement of said second portion (8) of the pin (6) from said second position (R), in that said seat (10) is provided in a lateral bottom portion (9) of the module (1), and in that said passage (13) extends from a part (14) of the bottom surface (15) of the module (1) to a part (16) of one of said walls (2, 3), from which said link ends (4) project, provided near one of said lateral walls (17).

6 Claims, 5 Drawing Sheets

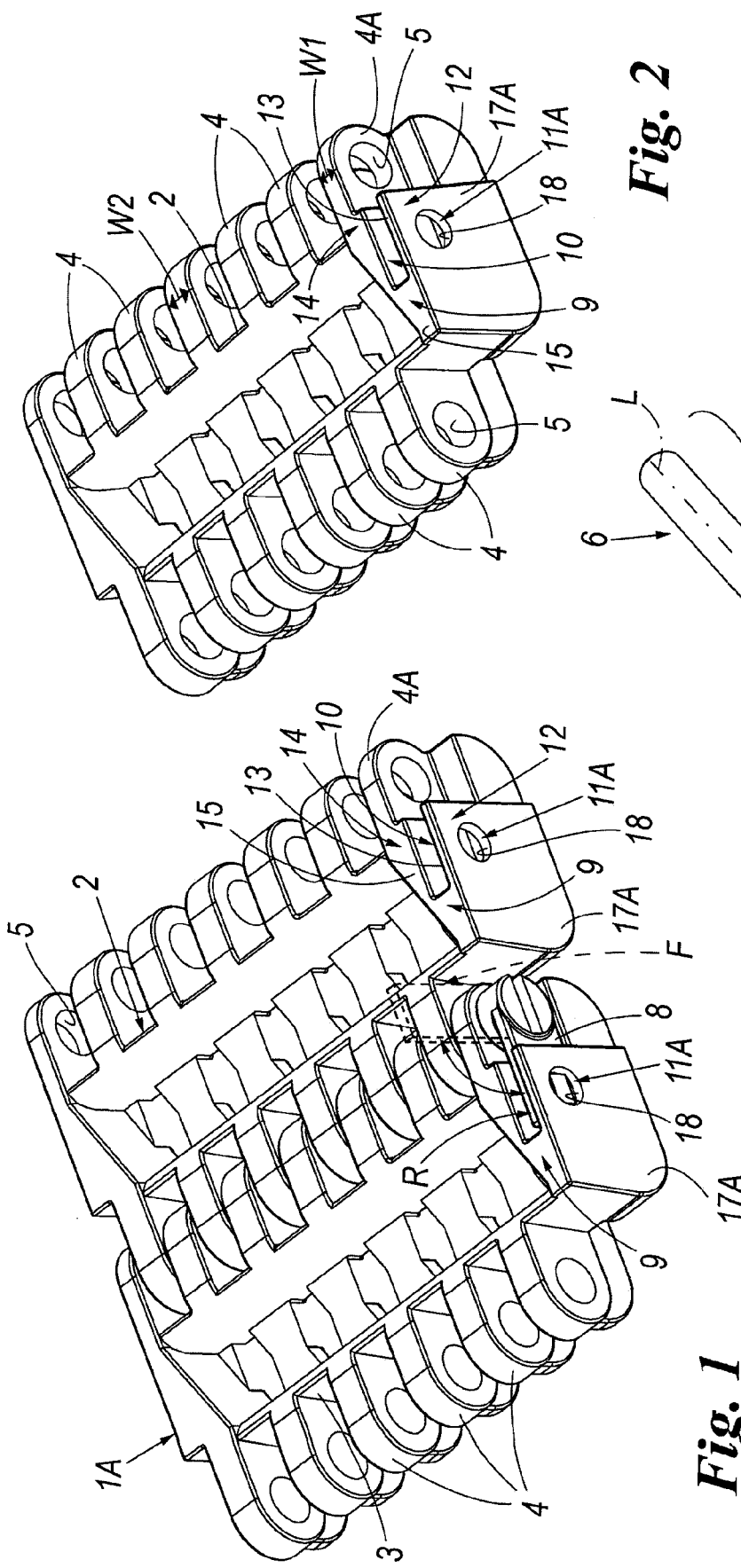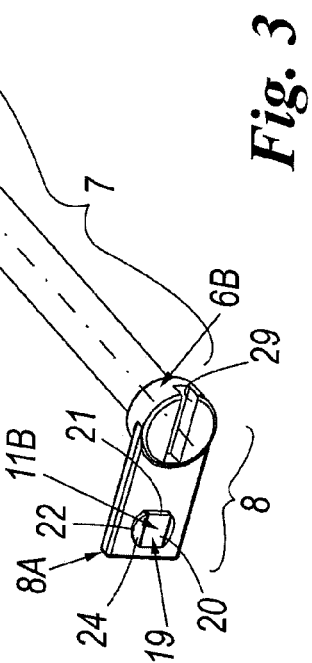

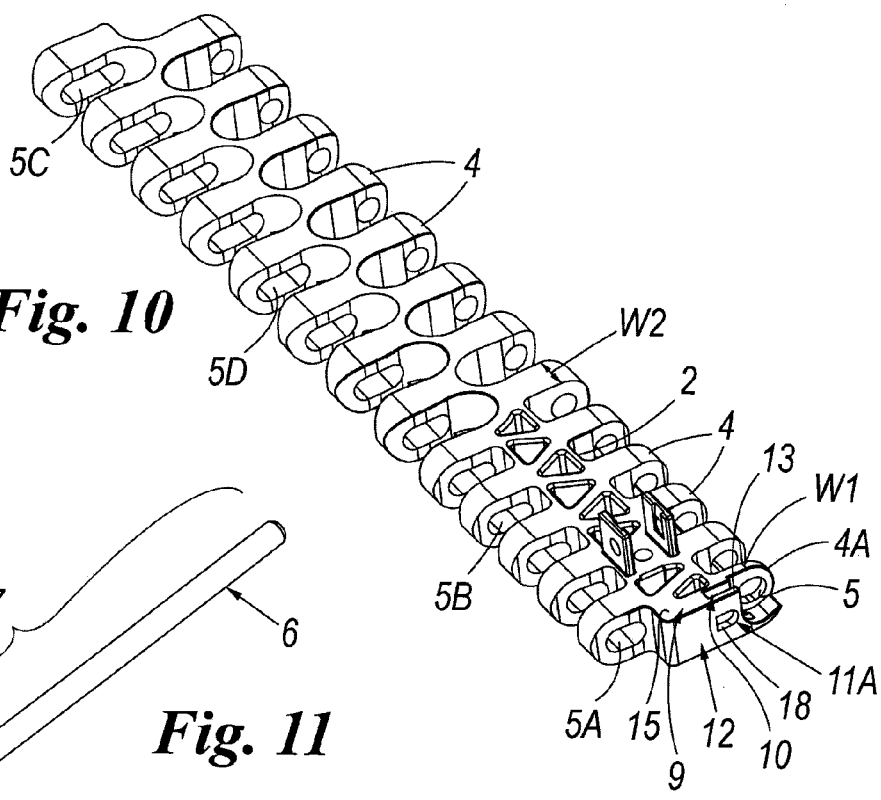
*Fig. 10*
*Fig. 11*
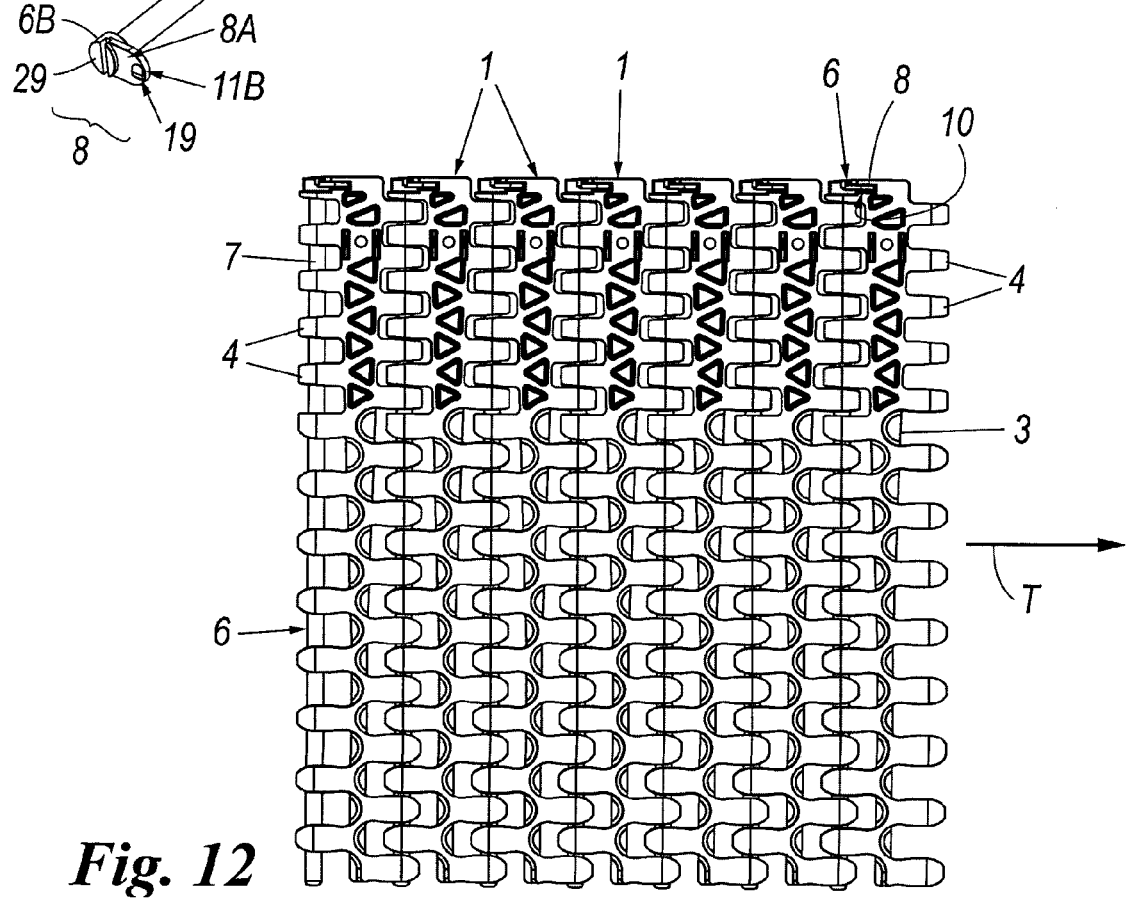
*Fig. 12*

CONVEYOR COMPRISING A PLURALITY OF HINGED MODULES AND MEANS FOR AVOIDING AXIAL DISPLACEMENT OF THE MODULE HINGE PINS

The invention relates to a conveyor according to the pre-characterised portion of claim 1.

Conveyor are traditionally built up from a large number of substantially identical modules hinged together by pins.

It is well known to provide inserts which are to be snap fitted in corresponding seats arranged in each module in order to avoid axial displacement of the hinge pins. The connection of these inserts to the modules and their removing if a module has to be replaced are quite troublesome operations. Besides, once a snap fitted pin is removed, it is often damaged and cannot be used again. On the other hand it may happen that these inserts fall out from their seats which is quite dangerous because the conveyor may break.

To overcome these drawbacks it is known to provide the hinge pin with a locking arrangement which releasably locks the hinge pins to the module without the need of additional separate parts; U.S. Pat. No. 6,662,938 discloses such a modified hinge pin. In this prior art pin arrangement it is still quite troublesome to mount or remove the pin from its seat in the modules because the walls around this seat need to be opened out and this operation may damage the module if it is not performed very carefully.

The present invention improves on the prior art conveyor in that by the invention it becomes easier to replace and/or assemble the modules.

A further object of the invention is to provide a conveyor in which the pin can be accessed or removed from the module without the risk of damaging the module.

The invention achieves these objects by providing a conveyor according to the characterising portion of claim 1.

Figure 4:
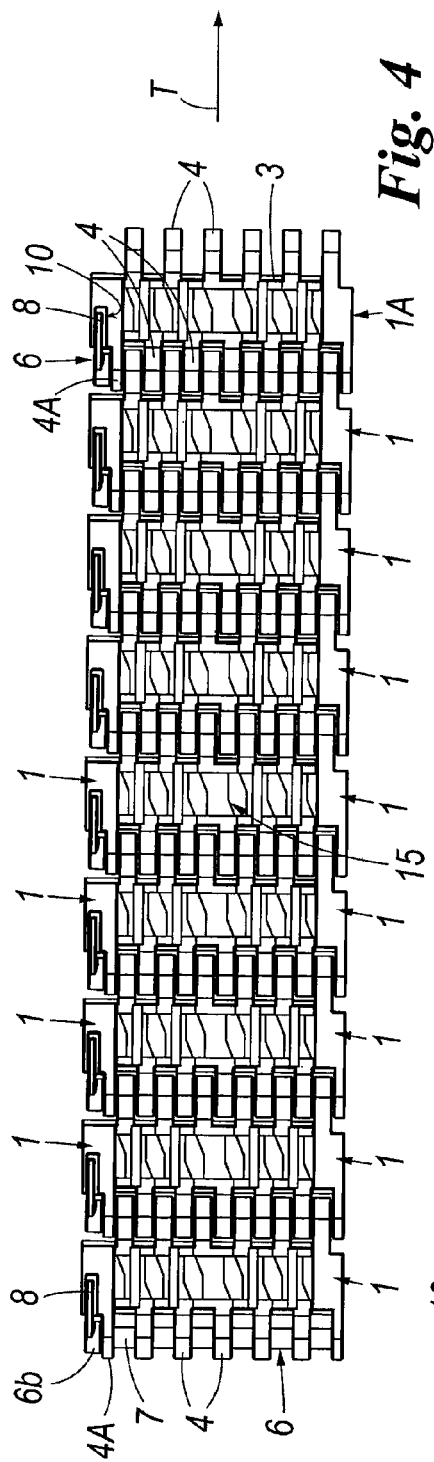
Figure 5:
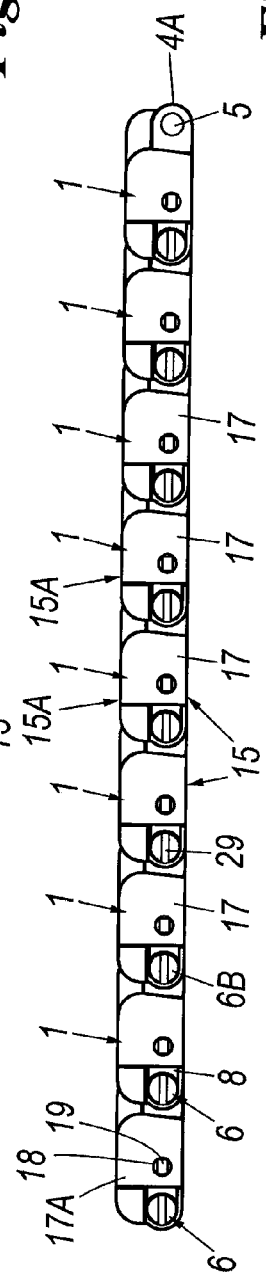
Figure 6:
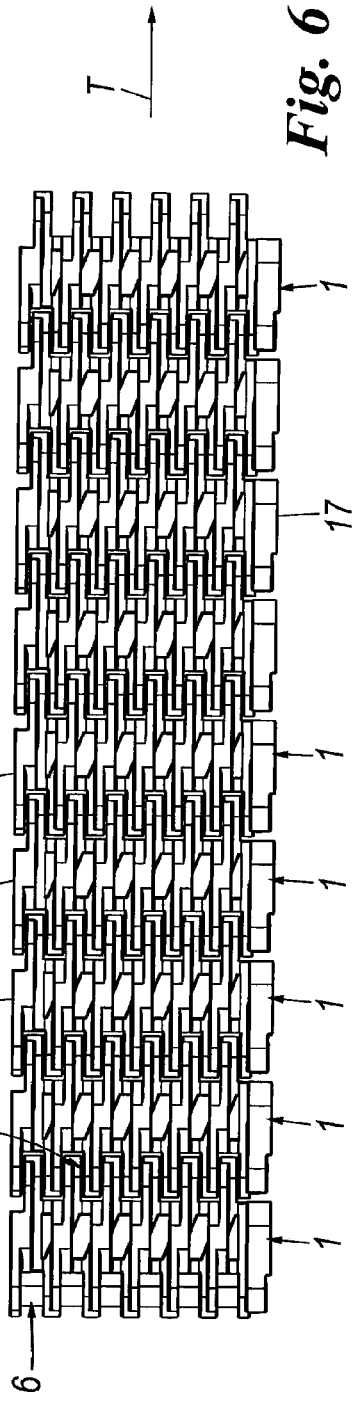
Figure 7:
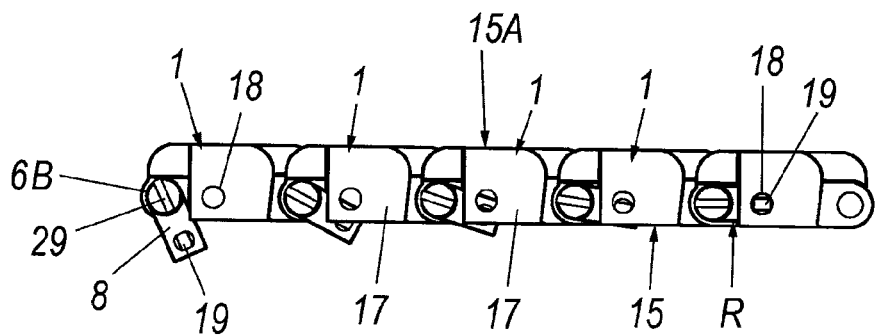
Figure 8:
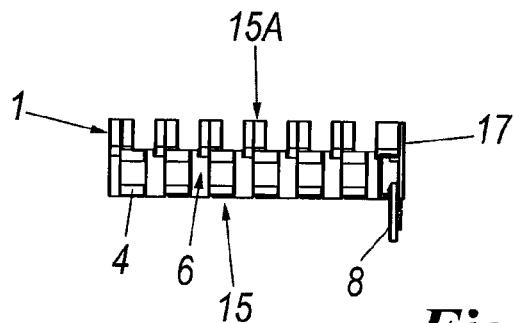
Figure 9:
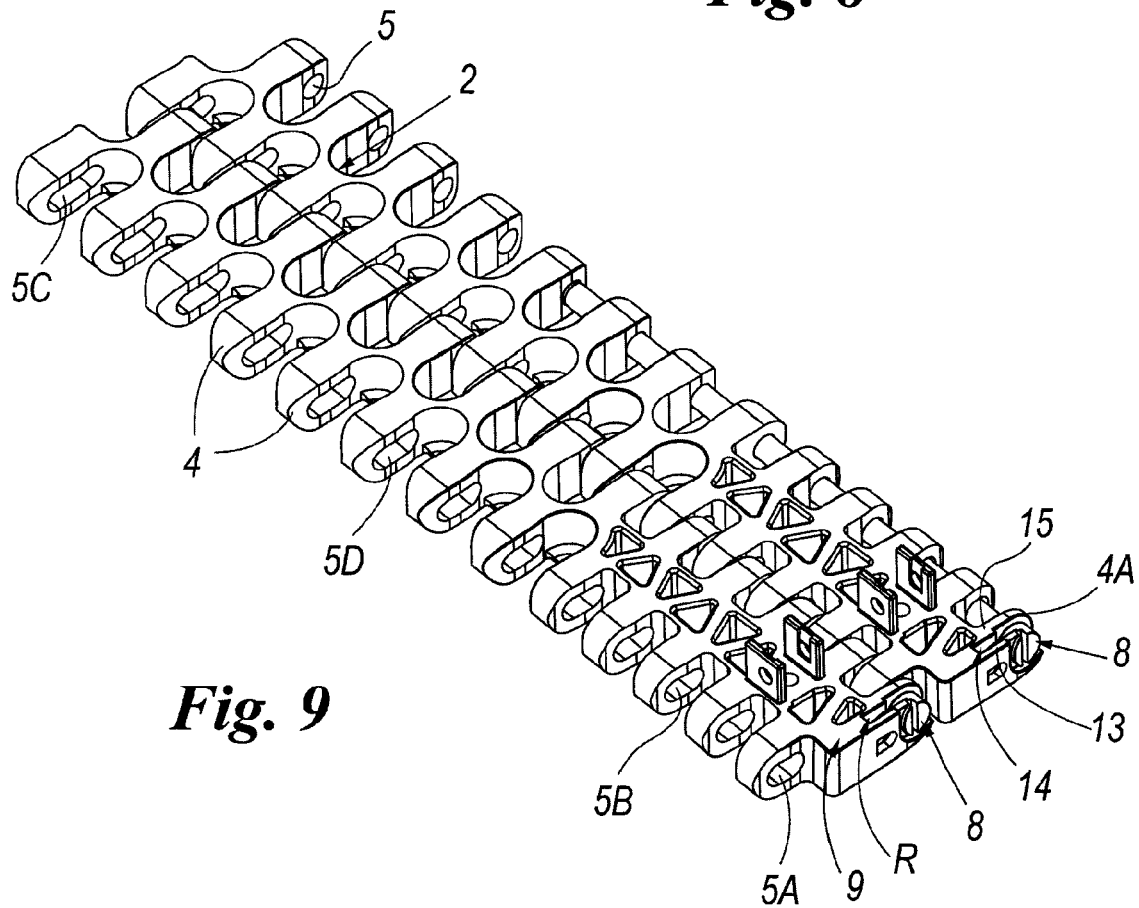
Figure 13:
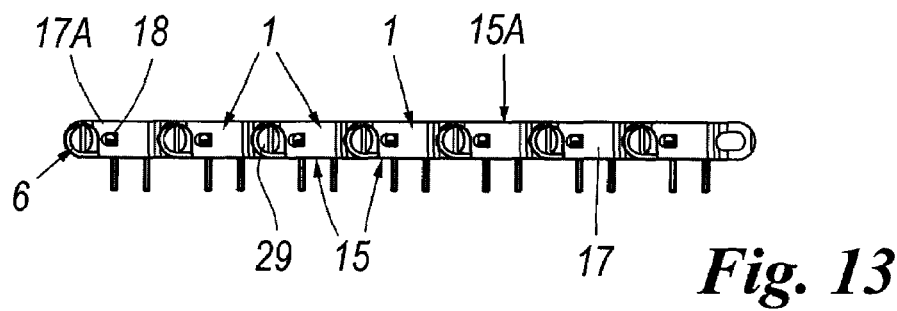
Figure 14:
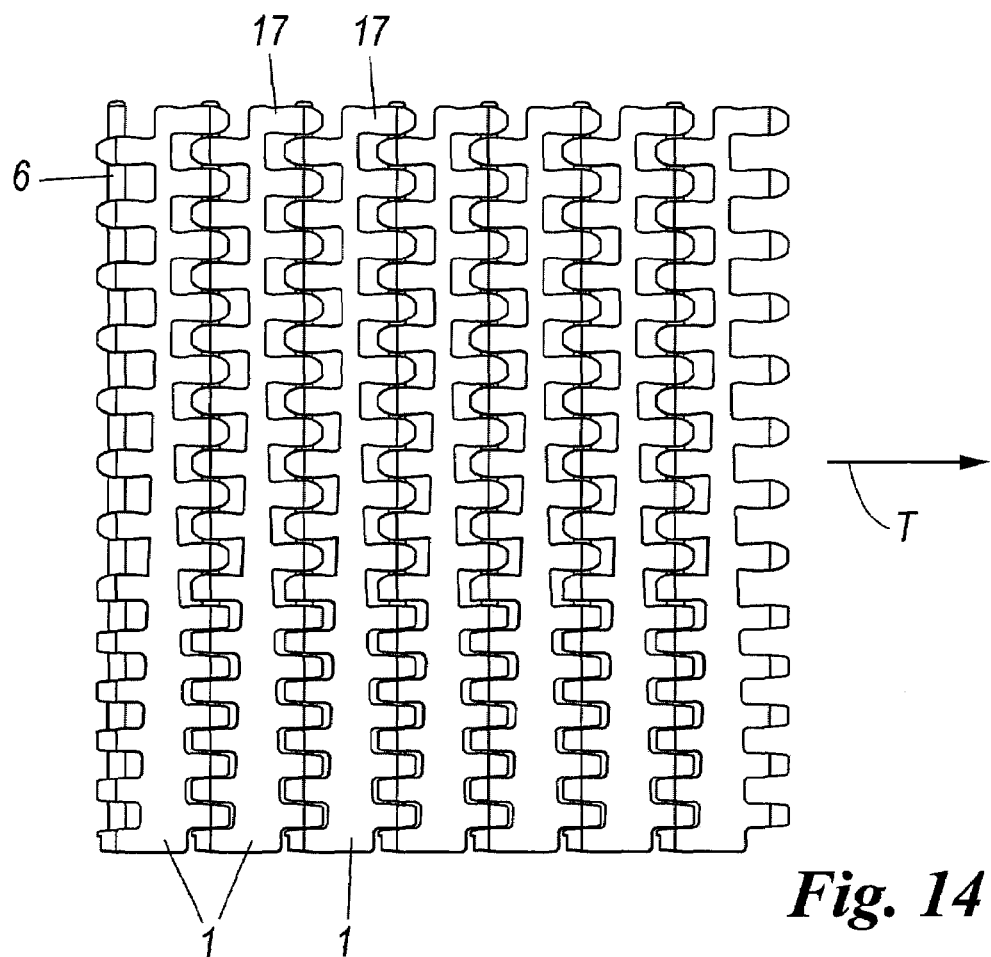
Figure 15:
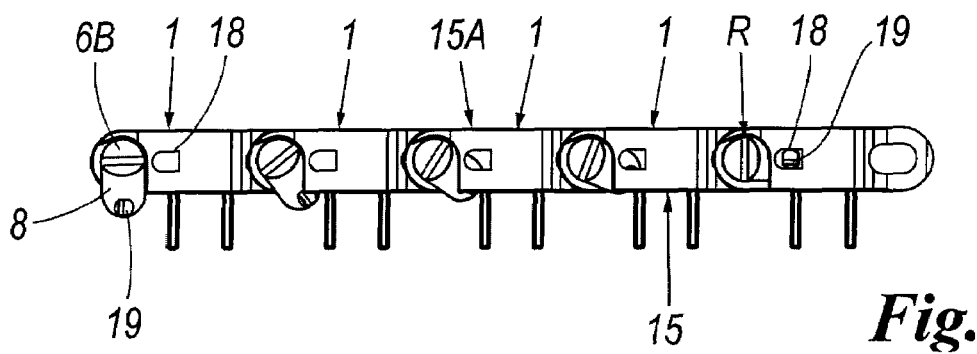

Further advantageous embodiments of the invention are represented in the sub-claims and will be elucidated on the basis of an exemplary embodiment represented in the following drawings:

FIG. 1 shows a schematic bottom perspective view of a portion of a conveyor according to the invention, FIG. 2 shows a schematic bottom perspective view of a module of the conveyor, FIG. 3 shows a schematic perspective view of a hinge pin for the conveyor, FIG. 4 shows a schematic bottom view of a bigger portion of a conveyor according to the invention, FIG. 5 shows a schematic lateral view of this bigger portion, FIG. 6 shows a schematic top view of this bigger portion, FIGS. 7 and 8 show, respectively, a lateral and front view of this bigger portion with the modules hinge pins in different operative positions;

FIGS. 9, 10, 11, 12, 13, 14 15 show, respectively views identical to those represented in FIGS. 1, 2, 3, 4, 5, 6, 7 of a portion of a conveyor comprising a second embodiment of the invention.

With reference to the above drawings a conveyor according to the invention comprises a multiplicity of identical modules 1A, 1B arranged in a row one after the other and extending transversely of an intended direction of travelling T of said conveyor. A module 1 comprises two parallel front and rear walls 2, 3, two parallel lateral walls 17 and a top 15A and bottom 15 surface. Each module comprises a plurality of module ends 4 projecting from its front 2 and a rear wall 3, the module ends of the module 1A in one row intermeshing with the module ends of the module 1B in an adjacent row. These module ends 4 include coaxially aligned first openings 5 adapted to receive a transverse pin 6 for realisably joining said modules 1A, B.

This pin 6 comprises a first cylindrical shaped portion 7 extending in said openings 6 and a second portion 8, radially departing from one end 6A of said first part 6. This pin 6 is rotatable, about the longitudinal axis L of its first portion 7, between a first position F (represented in dotted line in FIG. 1) not restricting axial movement of said pin and a second position R restricting axial movement of said pin 6. A lateral portion 9 of each module 1 comprises a seat 10 for housing and for restricting the axial movement of the second portion 8 of the pin 6 when the pin is rotated in the second position R. The seat 10 and the pin 6 comprise means 11 for releasably preventing displacement of the second portion 8 from its second position R. According to the invention the seat 10 and the pin 6 comprise means 11A, B for releasably preventing displacement of the second portion 8 of the pin from its second position R. Moreover, this seat 10 is provided in a lateral bottom portion 12 of each module 1A,B and comprises a first passage 13 for the second portion 8 of the pin, extending from a portion 14 of a bottom surface 15 of the module 1 to an end portion 16 of the wall 2, from which the connecting ends 4 project, provided near a lateral wall 17A of the module.

The means 11A, B for releasably preventing displacement of the second portion 8 of the pin 6 when it is rotated in its second position R comprise: a through hole 18 provided in the lateral wall 17A where the seat 10 is located and connecting said seat with an outer surface of said wall, and a projecting element 19 provided on the second portion 8 of the pin, for snap fitting in said through hole 18.

Preferably the first part 7 of the pin 6 is shaped and dimensioned as usual, but at its end 6A it comprises a cylindrical head 6B coaxial with this first part and having a diameter larger than that of this first part 7 and of those of the openings 5. Preferably the second portion 8 of the pin departs from this head 6B. The pin 6 and the module body are dimensioned in such a way that when the pin connects two modules the pin head 6B abuts the outer wall of the first link end 4A and the projecting portion 8 is coplanar with the seat 10 and may therefore be rotated in or out of this seat without any further adjustment of the pin position.

The pin head 6B comprises in its outer face a slit 29 into which it is insertable the head of a tool (standard screwdriver, not represented) for rotating the pin from its two different positions F and R.

The projecting element 19 provided on the second portion 8 of the pin 6 projects from the outer wall 8A of said second portion and comprises (see FIG. 3) a top surface 20, a pair of linear and parallel edges 21 (only one is visible in FIG. 3) and a pair of curved edges 22. In order to facilitate the snap fitting of the projecting element 19 in the corresponding through hole 18, the height of the curved edges 22 is decreasing and for this reason the top surface 20 comprises a pair of chamfered portions 24 adjacent these curved edges.

Preferably the nearest link end 4A to the seat 10 is shaped as the other link ends 4 but its width W1 is smaller than that W2 of the other link ends. This feature permits to create in the bottom part of the module enough space for housing the head 6B of the pin and the projecting portion 8, inside the perimeter of the module and at the same time having the possibility to dimension said head and second portion opportunely. This positioning of the pin head 6B and of its second portion 8 does not alter the shape of the top of the conveyor and allows a plurality of independent conveyor to run next to each other.

According to the invention once a pin 6 connects two modules with the help of a tool head inserted in the pin head slit 29 the pin is rotated until its portion 8 is housed in the seat 10 and the projecting element 19 snap fits into the hole 18 provided in the lateral wall of the module. It is to be noted that in this snap fitting connection it is the second portion 8 of the pin 6 that slightly elastically deforms to inwardly (i.e. to centre of the module) when the chamfered portion 24 of the projecting element 19 contacts the border of the seat 10. If the pin 6 has to be removed it is necessary to rotate its head 6B with the help of a tool head inserted in the head slit 29. The projecting element 19 of the second portion of the pin will then disengage from the hole 18.

Moreover it is to be noted that the seat 10 for the second portion 8 of the pin 6 may be provided at the end of either the front and the rear sets of the link ends 4 and that the figures showing this seat provided in a left portion of the rear link ends should be understood as a non-limiting example of the invention.

It is to be noted that the invention may be implemented both in conveyor chains and in conveyor belts and in particular in conveyor side flexing belt. FIGS. 9-15 show a portion of a side flexing belt comprising the invention. These FIGS. 9-15 comprise the same numbers used in the FIGS. 1-7 as both embodiments comprise similar technical details. The main difference between the two embodiments is that the side flexing belt comprises, as usual for such type of belts, on one side round openings 5 for the pin 6 and on the other side oval shaped openings 5A-5D for said pin. When the invention is implemented in side flexing belts thanks to the invention we are always sure about the position of the pin. This is particularly important in side flexing belts because the pin must be always in contact with the modules especially at the outer radius of the belt, where the pulling force is at the peak when the belt is in a curved path.

The invention claimed is:

1. A conveyor comprising a plurality of modules (1) arranged one after the other, each of said modules comprising two parallel front and rear walls (2,3), two parallel lateral walls (17) and a top (15A) and bottom surface (15) and a plurality of module link ends (4) projecting from said front and rear walls, the module ends (4) of one module intermeshing with the module ends of the previous and successive modules, said module ends (4) including coaxially aligned openings (5) adapted to receive a transverse pin (6) for releasably joining said modules, said pin (6) comprising a first cylindrically shaped portion (7) extending in said openings (5) and a second portion (8), radially departing from one end of said first portion, said pin being rotatable, about a longitudinal axis (L) of said first portion (7) of the pin (6), between a first position (F) not restricting axial movement of said pin (6) in said openings (5) and a second position (R) restricting said axial movement, a lateral portion (9) of each of said modules (1) comprising a seat (10) for housing said second portion (8) of the pin (6) and for restricting axial movement of said second portion (8) of the pin (6) when the pin is rotated in said second position (R), said seat (10) comprising a passage (13) for introducing in said seat at least a part of said second portion (8) of the pin (6), characterised in that said seat (10) and said pin (6) comprises means (11A, 11B) for releasably preventing the displacement of said second portion (8) of the pin (6) from said second position (R), in that said seat (10) is provided in a lateral bottom portion (9) of the module (1), and in that said passage (13) extends from a part (14) of the bottom surface (15) of the module (1) to a part (16) of one of said walls (2, 3), from which said link ends (4) project, said parts (14, 16) being provided near one of said lateral walls (17).

2. A conveyor according to claim 1 characterised in that the first portion (7) of the pin (6) comprises at one of its ends (6A) a cylindrical head (6B) coaxial with said first portion (7) and having a diameter larger than that of said first portion (7) and of those of said openings (5), in that the second portion (8) of the pin departs from said head (6B), and in that the pin (6) and the module body are dimensioned in such a way that when the pin connects two modules the pin head (6B) abuts the outer wall of a first link end (4A) and the second portion (8) is coplanar with the seat (10) and by rotating the pin said second portion (8) is rotated in or out of said seat (10) without any further adjustment of the pin position.

3. A conveyor according to claim 1 characterised in that the pin head (6B) comprises in its outer face a slit (29) into which it is insertable the head of a tool for facilitating the rotation of the pin from its two different positions (F, R).

4. A conveyor according to claim 1 characterised in that the means (11A, 11B) for releasably preventing the displacement of the second portion (8) of the pin (6) from said second position (R) comprise: a through hole (18) provided in the lateral wall (17A) of the module close to the seat (10) and in that said hole (18) connects said seat (10) with an outer surface of said wall (17A), and a projecting element (19) provided on the second portion (8) of the pin, for snap fitting in said through hole (18).

5. A conveyor according to claim 1 characterised in that the nearest link end (4A) to the seat (10) has a width (W1) which is smaller than that (W2) of the other link ends (4) of the module so as to create in the bottom part of each module enough space for housing a head (6B) of the pin (6) and a part of the second portion (8) of the pin (6), inside the perimeter of the module.

6. A conveyor according to claim 1 characterised in that the second portion (8) of the pin (6) is slightly elastically deformable for permitting the releasably snap fitting connection of the projection element (19) in the through hole (18).

* * * * *